United States Patent
Bader et al.

(10) Patent No.: US 7,772,140 B2
(45) Date of Patent: Aug. 10, 2010

(54) CERAMIC FABRICS AND METHODS FOR MAKING THEM

(75) Inventors: Yves Bader, Thoiry (FR); Kurt Hans Wyss, Chavannes De Bogis (CH); Siegfried Wittmann, Floersheim-Dalsheim (DE)

(73) Assignee: E.I. du Pont de Nemours and Company Dystar, Wilmington, DE (US)

( * ) Notice: Subject to any disclaimer, the term of this patent is extended or adjusted under 35 U.S.C. 154(b) by 673 days.

(21) Appl. No.: 11/712,194

(22) Filed: Feb. 27, 2007

(65) Prior Publication Data

US 2008/0038972 A1 Feb. 14, 2008

Related U.S. Application Data

(60) Provisional application No. 60/784,012, filed on Mar. 20, 2006.

(51) Int. Cl.
*B32B 5/02* (2006.01)

(52) U.S. Cl. .................................. 442/136; 427/387
(58) Field of Classification Search ............... 442/135, 442/136; 427/387
See application file for complete search history.

(56) References Cited

U.S. PATENT DOCUMENTS

| 4,022,718 | A | 5/1977 | Russo |
| 4,446,202 | A | 5/1984 | Mischutin |
| 4,631,224 | A | 12/1986 | George et al. |
| 2009/0311433 | A1* | 12/2009 | Wittmann .................. 427/387 |

FOREIGN PATENT DOCUMENTS

| EP | 1 199 400 | 4/2002 |
| EP | 1 380 616 | 1/2004 |

* cited by examiner

*Primary Examiner*—Arti Singh-Pandey

(57) ABSTRACT

Fabrics resistant to molten metal are provided, comprising non-melting base fabric treated with a composition comprising polymerisable polyurethane monomers, and ceramic particles.

22 Claims, No Drawings

CERAMIC FABRICS AND METHODS FOR MAKING THEM

FIELD OF THE INVENTION

The invention relates to the field of protective fabrics, in particular coated fabrics for protecting the wearer against molten metal spills.

BACKGROUND OF THE INVENTION

Workers in industry require garments that protect them from spills of molten metal, and from chronic exposure to splashing of molten metal.

To protect against molten metal, a garment should ideally be made of non-flammable fibre, and should also repel the molten metal and resist absorption, transfer, or penetration of the molten metal. Traditionally, workers with molten metals have worn garments made from fabrics made of non-melting fibres, such as cotton. The fabrics may be rendered flame retardant with phosphorus containing compositions, such as tetrakis hydroxymethyl phosphonium chloride, tetrakis hydroxymethyl phosphonium sulfate, and n-hydroxymethyl-3-(dimethylphosphono) propionamide (e.g. as sold under the trade name PYROVATEX CP by Ciba-Geigy Corporation). Such garments, although flame-retardant, often do not repel molten metal sufficiently, meaning that the molten metal stays in contact with the garment, may even be absorbed, and therefore has sufficient time to transfer large amounts of heat to the wearer, resulting in severe burns.

An attempt to address this problem is disclosed in U.S. Pat. No. 4,446,202 (Mischutin). A flame-retardant brominated compound is dispersed in an aqueous medium with a surfactant or emulsifying agent and a colloid as a binder or thickening agent, together with a high molecular weight polymer or latex. The resulting composition is applied to a fabric, and upon drying, either by heating or exposure to air at ambient temperatures, forms a film. The film is said to occlude the interstices between the fibres sufficiently to inhibit significantly the penetration into the fibres of particles of sprayed or splattered molten metal.

Another attempt to make fabric resistant to molten metal is described in U.S. Pat. No. 4,631,224, which discloses a molten metal resistant, coated fabric composition comprising:
(a) a base fabric, and (b) a coating on the surface of the fabric comprising (i) an inorganic binder composition colloidal silica, monoaluminum phosphate, aluminium chlorohydrate, and an amount of an alkyl tin halide catalyst effective to increase the bonding of said inorganic binder composition to said fabric (ii) an organic binder
(iii) metallic flakes having a saucer-like configuration, a particle size range of about 30 to about 150 microns and a thickness of about 0.5 to about 1.5 microns, the amounts of said inorganic binder composition and said organic binder being effective to bond said metallic flakes to said fabric.

There remains a need for alternative fabrics resistant to molten metal.

SUMMARY OF THE INVENTION

In a first aspect, the invention provides a composition for rendering a fabric resistant to molten metal, the composition comprising:
  a cross-linkable polymer;
  ceramic particles;
  a flame retardant; and optionally
  a silicone elastomer, and/or glyoxal.

In a second aspect, the invention provides a treated fabric that is protective against molten metal, the treated fabric comprising a base fabric comprising non-melting fibres, the base fabric being treated on one or both sides with a cross-linkable polymer cross-linked to form a matrix with the fibres of the base fabric, ceramic particles suspended therein, a flame retardant and optionally a silicone elastomer and/or glyoxal.

In a third aspect, the invention provides a garment for protecting the wearer against molten metal, the garment comprising a treated fabric, the treated fabric comprising a base fabric comprising non-melting fibres, the base fabric being treated on one or both sides with a cross-linkable polymer cross-linked to form a matrix with the fibres of the base fabric, ceramic particles suspended therein, a flame retardant, and optionally a silicone elastomer and/or glyoxal.

In a fourth aspect, the invention provides a method or process for manufacturing a fabric protective against molten metals, the method comprising the steps:
  (1) providing a base fabric comprising non-melting fibres;
  (2) treating the base fabric with:
    a cross-linkable polymer;
    a cross-linking agent;
    ceramic particles;
    a flame retardant; and optionally
    a silicone elastomer and/or glyoxal;
  (3) cross-linking the polymer to form a matrix with the fibres of the base fabric with the ceramic particles suspended therein.

In a fifth aspect, the invention provides a use of a treated fabric to protect the wearer from molten metal, wherein the treated fabric comprises a base fabric comprising non-melting fibres, the base fabric being treated on one or both sides with a composition comprising a polymer cross-linked to form a matrix with the fibres of the base fabric, and ceramic particles suspended in the matrix.

In a sixth aspect, the invention provides a method for protecting a person from molten metal, comprising the step of providing the person with a garment comprising a treated fabric, wherein the treated fabric comprises a base fabric comprising non-melting fibres, the base fabric being treated on one or both sides with a composition comprising a polymer polymerised to form a matrix with the fibres of the base fabric, and ceramic particles suspended in the matrix.

In a seventh aspect, the invention provides the use of a treated fabric for the manufacture of a garment for protecting the wearer against molten metal, wherein the treated fabric comprises a base fabric comprising non-melting fibres, the base fabric being treated on one or both sides with a composition comprising a cross-linkable polymer cross-linked to form a matrix with the fibres of the base fabric, and ceramic particles suspended therein.

In an eighth aspect, the invention provides a method or process for making a ceramic coating compositions comprising mixing in an aqueous solvent the following:
  a cross-linkable polymer;
  ceramic particles;
  a flame retardant; and optionally
  a silicone elastomer and/or glyoxal.

In a ninth aspect, the invention provides a use of a ceramic coating composition for making a fabric resistant to molten metal, wherein the ceramic coating composition comprises:
  a cross-linkable polymer; and
  ceramic particles.

DETAILED DESCRIPTION OF PREFERRED EMBODIMENTS

Abbreviations
PU: polyurethane
M5: polypyridobisimidazole, represented by the formula:

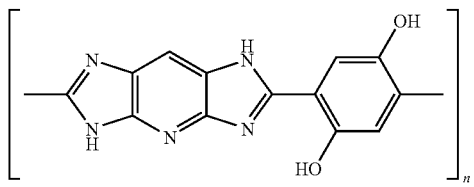

HMDI: hexamethylenediisocyanate

The invention provides a treated fabric that resists the absorption of molten metal, causing it to run off the fabric, while at the same time being flame resistant and resisting the transfer of heat. The fabric of the invention can be used to make protective garments that protect the wearer from molten metal spills and splashes. The entire garment may be made of the treated fabric, or high-risk zones may be made with the treated fabric, while lower-risk zones are made of other fabric.

The fabric of the invention comprises a base fabric made of non-melting fibres. The expression "non-melting fibres" encompasses those fibres which carbonise as the temperature is increased, before, or very close to melting. Particularly preferred non-melting fibres include organic non-melting fibres, for example, cellulose fibres (e.g. cotton, wood fibres, linen, viscose, rayon), wool, aramid fibres (e.g. para-aramid, such as Kevlar®, and meta-aramid, such as Nomex®), polybenzimidazoles, polyimides, polyarenes, rayon (e.g. lyocell), polypyridobisimidazoles (M5, see abbreviations, above), and mixtures of these. Preferred non-melting fibres for the fabric of the invention are selected from viscose, aramids (e.g. p-aramid, m-aramid), M5, and wool. These fibres can be used at 100 wt % or as blends of these.

In some embodiments, the non-melting fibres may be blended with melting fibres, such as polyesters, polyamides, and polypropylenes.

The base fabric is treated with a ceramic composition comprising a cross-linkable polymer, for example, a polyurethane, polyvinyl chloride, fluoroethyleneprpylene, silicones, melamine, polyacrylates. Preferably the cross-linkable polymer is a polyurethane.

When the cross-linkable polymer is a polyurethane, preferably it is a polyurethane that will yield a flexible or elastomeric polyurethane on cross-linking. This improves the suppleness and wearability of the treated fabric.

A polyurethane is a polymer made from a polyisocyanate (often a diisocyanate) and a polyol (often a diol). Examples of polyisocyanates, which may be used, include aromatic polyisocyanates, such as phenylene diisocyanate, toluene diisocyanate (e.g. 2,4- and 2,6-), tetramethylxylenediisocyanate, xylenediisocyanate, methylenediphenyl diisocyanate (MDI), as well as aliphatic and cycloaliphatic polyisocyanates, such as dicyclohexylmethane-4,4'-diisocyanate, hexamethylene diisocyanate, tetramethylenediisocyanate, trimethylhexamethylenediisocyanate, isophorone diisocyanate, and mixtures of any of these. Polymeric isocyanates (such as polymeric MDI) may also be used. Also suitable are "prepolymers" of these polyisocyanates comprising a partially pre-reacted mixture of a polyisocyanate and a polyether or polyester polyol.

Typically, the above polyisocyanates are used in an amount relative to the polyol to establish an isocyanate index in the range of 80 to 400.

The polyol may be either a polyol, a polyether, or a polyester, having preferably from 2 to 25 carbon atoms. Examples include ethane diol, propane diol, butane diol, pentane diol, hexane diol, decane diol, diethylene glycol, 2,2,4-trimethylpentane diol, 2,2-dimethylpropane diol, dimethylcyclohexane diol, 2,2-bis(4-hydroxyphenyl)-propan (Bisphenol A), 2,2-bis(4-hydroxyphenyl)butane (Bisphenol B), 1,1-bis(4-hydroxyphenyl)-3,3,5-trimethylcyclohexane (Bisphenol C), aromatic polyesterpolyols, polycaprolactone, poly(ethylene oxide), and poly(propylene oxide) polymers and copolymers with terminal hydroxyl groups derived from polyhydric compounds, for example diols and/or triols. Such diols and triols include, as non-limiting examples, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, sugars such as sucrose, and other low molecular weight polyols. Also useful are amine polyether polyols which can be prepared by reacting an amine, such as ethylenediamine, diethylenetriamine, tolylenediamine, diphenylmethanediamine, triethanolamine or the like, with ethylene oxide or propylene oxide.

A suitable catalyst for polyurethane formation is a hindered amine, for example, diazobicyclo[2.2.2]octane (DABCO), Di-[2-(N,N-Dimethylaminoethyl)]ether, Bis-(3-dimethylamidopropyl)amino-2-propanolamine, Pentamethyldipropylenetriamine, N,N-Dimethylcyclohexanamine (DMCHA), Tri(dimethylaminomethyl)phenol, 1,3,5-tri (dimethylinpropyl)hexahydrotriazine, DMDEE, Dimorpholinepolyoxyethylene ether, 1-methyl-4-dimethylaminopiperazine, Pentamethyldipropylenetriamine, 1,8-Dinitrogen heterodicyclo[5,4,0]endecatylene-7, Dimethylinpropyl-dipropanolamine, Triethylene-diamine-1,4-diol. Other examples of catalysts are tertiary amines, organotin compounds, and carboxylate urethane catalysts (gelling and/or blowing). Typical examples of useful catalysts are amine catalysts such as triethylenediamine, dimethylcyclohexylamine, tetramethylhexanediamine, bis(dimethylaminoethyl) ether, tri(dimethylaminopropyl)hexahydrotriazine, 1-isobutyl-2-methylimidazole, 1,2-dimethylimidazole, dimethylaminoethanol, diethylaminoethanol, pentamethyldiethylenetriamine, pentamethyldipropylenetriamine, methylmorpholine, ethylmorpholine, quaternary ammonium salts, salts of an organic acid, and tin catalysts such as dibutyltin dilaurate and the like.

Advantageously, the polyurethane used for the ceramic composition and the fabric of the invention has the following components:
  20-60 wt % of at least one isocyanate;
  5-50 wt % of at least one polyetherdiol;
  0-10 wt % of one or more aliphatic or cycloaliphatic diols;
  0-50 wt %, preferably 5 to 50 wt % of one or more polyester diols;

The preferred polyurethane for use in the ceramic compositions of the invention is made with the monomers hexamethylenediisocyanate (HMDI) and a polyesterpolyol having a linear or branched polyester component. The preferred polyurethane has a weight average molecular weight of 1,000-10,000 g/mol. Suitable polyurethanes are available commercially under the tradenames Alberdingk-PU® (Alberdingk), Impranil® (Bayer), and Permutex® (Stahl).

Polyurethane chains have unreacted hydroxyl ends which can be cross-linked to form interchain bonds by adding additional polyisocyanate cross-linking agent. The ceramic compositions of the invention are used by applying them to the surface of a base fabric and initiating interchain cross-linking, preferably using a cross-linking agent, and optionally a catalyst. Preferred cross-linking agents are the polyisocyanates mentioned above. Particularly preferably the polyisocyanate cross-linking agent is capped, for example with oxime groups. The capping group falls off at elevated temperatures (e.g. in the order of 140-200° C.), initiating cross-linking. A preferred oxime capping group is butane oxime. Preferably the cross-linking agent has more than two isocyanate groups, particularly preferably it has three isocyanate groups. The cross-linking agent is preferably present at or about 1 to 10 wt %, more preferably at or about 3 to 8 wt %, based on the total weight of the ceramic coating composition, minus the solvent.

The cross-linkable polyurethane for use in the ceramic composition of the invention may be selected from those that can be cross-linked under conditions that will not damage the base fabric. Cross-linking may be initiated with heat and/or by the use of a catalyst. If a catalyst is added, preferably it is added immediately prior to application of the ceramic composition to the base fabric. A cross-linking agent may be added to the ceramic composition and the ceramic composition stored at low temperature (i.e. below at or about 20° C., more preferably below at or about 4° C.), until application. After application of the ceramic coating composition to the base fabric, the treated fabric is heated to cause cross-linking. Alternatively, a cross-linking agent and/or catalyst may be added to the ceramic composition immediately prior to application of the ceramic composition to a base fabric.

The ceramic composition contains particles of ceramic. The term ceramic refers to any of various hard, brittle, heat-resistant, and corrosion-resistant materials made by shaping and then firing a non-metallic mineral, such as clay, at a high temperature. Ceramics include but are not limited to:

Silicon nitride ($Si_3N_4$)
Boron carbide ($B_4C$)
Silicon carbide (SiC)
Magnesium diboride ($MgB_2$)
Zinc oxide (ZnO)
Ferrite ($Fe_3O_4$)
Steatite
aluminium silicates
Yttrium barium copper oxide ($YBa_2Cu_3O_{7-x}$)
Boron nitride
Barium titanate (often mixed with strontium titanate)
Lead zirconate titanate
Zirconia
Ferrite ($Fe_3O_4$)
Steatite
aluminium silicates
Preferred ceramic particles are silicon carbide.
The particles preferably have a size distribution between at or about 0.1 to 10 microns.

Preferred ceramic particles are silicon carbide, particularly silicon carbide particles with a size distribution between 0.1 to 10 microns.

The ceramic composition is made by suspending the cross-linkable polymer and the ceramic particles in a suitable solvent, for example water, methanol, ethanol, propanol, toluene, ethyl acetate, and the like (preferably water). A cross-linking agent and/or catalyst may be added and the ceramic compositions stored until use, or the cross-linking agent and/or catalyst may be added to the ceramic composition just before application of the composition to a base fabric. The cross-linkable polymer is preferably present at or about 25 to 65 wt %, more preferably at or about 33 to 53 wt % based on the weight of the ceramic composition, minus the solvent.

Ceramic particles are advantageously present at or about 1 to 40 wt %, preferably 2.75 to 30 wt %, based on the total weight of the ceramic composition, minus the solvent.

The ceramic composition and the fabrics of the invention may additionally comprise glyoxal. Glyoxal is particularly useful with cellulosic fibres, such viscose, decreasing shrinking and swelling of the yarn. The addition of glyoxal improves the ability of the resulting treated fabric to withstand humidity and wetness. On exposure of the treated fabric to humidity, swelling of the base fabric may result. If the cured ceramic composition is not sufficiently resilient, the swelling of the base fabric may crack the cured composition. The addition of glyoxal decreases this cracking phenomenon. Glyoxal may be present in the ceramic coating composition, or it may be applied to the treated fabric before or after application of the ceramic coating. Preferably it is applied before application of the ceramic coating.

The ceramic composition and the fabrics of the invention advantageously comprise a silicone elastomer. Silicone elastomers are also known as silicone rubbers, and result, for example, from the polymerisation of dichlorosilanes $R_2SiCl_2$, where R is, for example, methyl, ethyl, vinyl, or phenyl. A preferred silicone elastomer is polydimethylsiloxane. The addition of a silicone elastomer improves the suppleness and resilience of the treated fabric, leading to better drape and improved feel for the wearer. If a silicone elastomer is present, it is preferably used at a concentration of at or about 2 to 15 wt %, more preferably at or about 5 to 10 wt %, based on the total weight of the ceramic composition, minus the solvent.

The ceramic composition and the fabrics of the invention may advantageously comprise a flame retardant. The flame retardant is preferably selected from phosphorus-containing flame-retardants, for example, red phosphorus, phosphates, such as trimethylphosphate, triethylphosphate, trischloropropylphosphate, tetrakis(2-chloroethyl) ethylene phosphonate, pentabromodiphenyl oxide, tris(1,3-dichloropropyl) phosphate, tris(beta-chloroethyl) phosphate, ammonium phosphate, tricresyl phosphate, Suitable halogen-containing organic flame retardants include halogen-containing organic compounds known in the art for use as flame retardants. Examples of halogen-containing organic flame retardants are halogen-containing aromatic flame retardants, such as brominated diphenyl ethers (e.g., pentabromodiphenyl oxide and decabromodiphenyl oxide), polytribromostyrene, trichloromethyltetrabromobenzene, tetrabromobisphenol A, and an aromatic brominated flame retardant available as SAYTEX 8010 from Ethyl Corporation. Other flame-retardants include dibromopropanol, hexabromocyclododecane, dibromoethyldibromocyclohexane, tris(2,3-dibromopropyl)phosphate, and tris(beta-chloropropyl)phosphate, dibromopentaerythritol, hexabromocyclododecane, and trichloropropyl phosphate.

A preferred flame-retardant is red phosphorus.

It is also possible to use mixtures of several components selected from one or several of these groups as flame retardants.

If a flame-retardant is used, it is preferably present at or about 2 to 20 wt %, more preferably 5 to 15 wt %, based on the total weight of the ceramic composition, minus the solvent.

Alternatively, the polyurethane may comprise monomers that confer flame-resistance on the polyurethane, as disclosed, for example in U.S. Pat. No. 4,022,718 (Russo), incorporated herein by reference. Examples of such monomers are 2,3-dibromo-2-butenediol-1,4.

The ceramic composition may advantageously comprise a silicone defoaming agent. The silicone defoaming agent is preferably present at or about 0.1 to 4 wt %, more preferably at or about 0.5 to 2 wt %, based on the total weight of the ceramic composition, minus the solvent.

The ceramic composition may additionally comprise a thickener, which facilitates the application of the composition to the fabric. If the composition is thickened to the point of forming a paste, it can be applied to the fabric by spreading, for example, with a knife or spatula. The thickener also helps the composition to cling to the fabric until the polyurethane is polymerised. Suitable thickeners are selected from polyacrylates and polyurethanes. Particularly preferred are polyacrylates, including homo- and copolymers of acrylic acid and/or methacrylic acid, optionally with ethylenically unsaturated comonomers. For spreading with a knife, the preferred viscosity of the ceramic composition is in the range of at or about 5000 to 7000 mPa·s, more preferably at or about 6000±500 mPa·s. The thickener is preferably added at a concentration of at or about 0.1 to 4 wt %, more preferably at or about 0.2 to 2 wt %, based on the total weight of the ceramic composition, minus the solvent.

In addition to application by spreading, the ceramic composition, if prepared to have a lower viscosity (e.g. 400-1,000 mPa·s), can be applied by spraying, soaking, painting, or dipping.

After application of the ceramic composition to one or both surfaces of the base fabric, it is necessary to cross-link the polyurethane molecules. This can advantageously be done by heating to a temperature sufficient to initiate cross-linking, for example, at or about 100 to 200° C. Heating can be done on a tentering frame, or by calendaring or using another suitable device. Calendaring is preferably carried out at or about 120-300° C., more preferably at or about 150° C., with a nip pressure of at or about 15-45 tonnes, more preferably at or about 30 tonnes.

In addition to cross-linking the cross-linkable polymer, heating drives off the solvent or solvents used to make the ceramic composition. Prior to heating and/or calendaring the treated fabric (and the ceramic composition coated thereon) may be dried, for example using forced air.

If glyoxal was not present in the ceramic composition when applied to the fabric, it may be applied to the treated fabric before heating and/or calendaring to cross-link the cross-linkable polymer.

Treated fabric of the invention provides excellent protection against molten metal spills. The fabric may advantageously be used to make garments to protect the wearer against spills of molten metal. The garment may be made using known methods for manufacturing garments. For some uses, it may be desirable to have only high-risk portions of the garment made from the treated fabric of the invention. For example, the cuffs of trousers and shirts (or coveralls) are often exposed to small molten metal splashes, hence it may be desirable to have only these areas made of the treated fabric of the invention.

EXAMPLES

This example illustrates the effect of ceramic coatings on molten metal performance. All percentages are by weight unless otherwise indicated.

Base Fabric

40% of variable length staple wool fibre, 28% viscose staple fibre (treated with flame-retardant) having a variable staple length in the range of 8 to 12 cm, 29% of crimped poly (metaphenylene isophthalamide) (MPD-I) staple fibre, also having a variable staple length in the range of 8 to 12 cm, 1% of p-aramid (Kevlar®) fibres and 2% of P-140 carbon core polyamide sheeted fibres were blended together via a combing process to make an intimate blend of staple fibres.

The wool was preliminary top dyed using a conventional acid dyeing procedure.

The blend of staple fibres were then spun by the ring spinning process into staple yarns using a conventional long staple worsted processing equipment. The staple yarns were then plied together on a two step twisting process and treated with steam to stabilize the yarns from wrinkling. The resulting plied yarn had a linear density of 50 tex. The yarns were woven into a 247 g/m$^2$ 2×1 twill weave fabric having 28.0 ends/cm and 19.5 picks/cm with a width of 165 cm. The fabric was washed, dried at 100° C. with maximal overfeed in the stenter, and Sanforised.

The finished fabric had 28.5 ends/cm and 22.0 picks/cm and the final raised to 269 g/m$^2$ with a width of 160 cm.

Ceramic Coating Composition

A paste was prepared containing:
(1) 70 wt % of a PU-based binder made from monomers HMDI and a polyesterpolyol having a linear or branched polyester component. The binder PU had a weight average molecular weight of 5,000 g/mol.
(2) 30 wt % ceramic particles consisting of silicon carbide particles with a size distribution between 0.1 to 10 microns.

To this paste was added:
5 wt % of a cross-linking agent consisting of triisocyanate capped with butaneoxime,
6 wt % of red phosphorus;
1 wt % of a silicone defoaming agent;
7 wt % of a silicone elastomer (polydimethylsiloxane);
5 wt % of colour imperon navy K-fr; and
0.6 wt % of a polyacrylate thickener.

Water was added to form a solution having a viscosity of 6000 mPa·s+/−500, and a pH of 7-9.

Coating of Base Fabric

The ceramic coating composition was applied to the base fabric: An industrial coating machine was used with a 1 mm coating knife. The fabric processing rate was set at 15 m/min. The machine was linked to a stenter frame to dry the coating. The stenter temperature started at 100° C. for the first box and finished at 160° C. for the last (fifth) box, the exposure time was 90 s.

The quantity of ceramic coating composition applied to the fabric was 60 g/m$^2$ after drying.

The coated fabric was then padded in a glyoxal reactant finishing agent with low formaldehydes. This process results in cross-linking of the fibres, in particular the viscose fibres contained in the fabric, to achieve better wash shrinkage behaviour and reduce swelling of the fibres when wet.

The fabric was dried on a stenter frame.

The fabric was calendared at 150° C. with 30 t pressure to produce an example of the treated fabric of the invention.

Molten Metal Resistance of Untreated Base Fabric (Comparative)

The base fabric (i.e. untreated) was tested against molten iron, according to the norm EN 531: 1995 Clause 6.6 Molten iron splash, using the test method EN 373: 1993 using iron as the metal.

In this test the fabric sample is fastened overtop of a PVC layer on a board. The board is inclined at a specified angle to the horizontal, and a specified quantity of molten metal is poured onto the face of the fabric from a specified height. After cooling, a molten metal splash index is assigned by evaluation of the following:

The PVC film is examined for smoothing, melting or pinholing of the PVC film. If any of these defects appear and the width of the defect is greater than or equal to 5 mm, the fabric is judged as failing the molten metal test. If discrete spots of defects occur, the fabric is judged as failing the test if the total width of the spots is greater than or equal to 5 mm.

The higher the number of grams of molten metal that can be poured on the fabric without damaging the PVC skin (i.e. a "failed" test), the better the fabric resists molten metal.

The test conditions were:

| Metal | Iron |
|---|---|
| Pouring temperature | 1400 ± 20° C. |
| Quantity of molten metal | 200-208 g |
| Pouring height | 225 ± 5 mm |
| Specimen angle to the horizontal | 75 ± 1° |

The performance for the base fabric (i.e. untreated) is listed in Table 1.

TABLE 1

Molten metal splash index (according to EN 531) for untreated fabrics (comparative)

| Property | EN 531 Requirements | | Result Obtained for base (untreated fabric) | Level of base (untreated) fabric |
|---|---|---|---|---|
| 6.6 Molten iron splash (E) | Level E1 E2 E3 | Index, g 60-120 121-200 201→ | Molten Metal Splash Index >60 g (but <121 g) | E1 |

Molten Metal Resistance of Treated Fabric of the Invention

The treated fabric of the invention was tested against molten iron, according to the norm EN 531: 1995 Clause 6.6 Molten iron splash, using the test method EN 373: 1993 using molten iron. The test conditions were as for the base (untreated) fabric.

The treated fabric was also tested against the norm EN 531: 1995 Clause 6.6 Molten iron splash, using the test method EN 373: 1993 using molten aluminium. The test conditions were:

| Metal | Aluminium |
|---|---|
| Pouring temperature | 780 ± 20° C. |
| Quantity of molten metal | 203-204 g |
| Pouring height | 225 ± 5 mm |
| Specimen angle to the horizontal | 60 ± 1° |

The performance of the treated fabric in the two tests is listed in Table 2. Fabrics were tested also after repeated washing. Washing conditions are listed below.

TABLE 2

Molten metal splash index according to EN531 for treated fabric of the invention

| | Molten metal splash index |
|---|---|
| Molten iron splash before washing (EN373) | E3 |
| Molten aluminium splash before washing (EN373) | D2 |
| Molten iron splash (EN373) After 25 washes and 5 dries | E3 |
| Molten aluminium splash (EN373) After 25 washes and 5 dries | D2 |

Table 2 shows that the treated fabric according to the invention qualifies as E3 for molten iron splashes. This is substantially better that the untreated fabric which has an index of E1. This means the fabric of the invention is more protective against molten iron splashes. This protective effect is maintained even after twenty-five washes.

The treated fabric of the invention also shows protection against molten aluminium.

Washing Conditions

Molten metal resistance is preferably maintained for the treated fabrics of the invention even after repeated washing.

The treated fabric described above was washed according to the Operating Procedure No: EFL-028 and to the standard ISO 5077. One drying cycle was performed after every 5 washing cycles Washing:
Temperature: 60±3° C.
Detergent: 1 g/l of IEC The washing was done with a front loading horizontal drum machine (Type A1) according to the standard ISO 6330 (Method A2) and to the Operating Procedure No: EFL-029.

Drying:
The drying was done with a tumbling machine according to the standard ISO 6330 and to the Operating Procedure EFL-029 Temperature: 60±3° C.

Other Properties of the Treated Fabric of the Invention

The treated fabric of the invention was also tested according to:

Determination of abrasion (Martindale) by number of cycles to breakdown, according to the standard EN ISO 12947-2.

Test Conditions:
Climate: 20±3° C., 65±5% relative humidity
Pressure applied: 12 kPa
Determination of breaking strength and elongation (Strip method) (ISO 5081 1977)
Determination of limited flame spread (ISO 15025-2003—method B)

Table 3 summarises the properties and shows that the ceramic coating does not negatively impact the textile physical properties of the fabric and the flammability, and improves the abrasion resistance.

TABLE 3

Properties of treated fabric of the invention
in comparison with untreated base fabric

|  | Treated fabric of the invention | | Untreated base fabric | |
| --- | --- | --- | --- | --- |
| Total weight (g/m$^2$) | 296 | | 269 | |
| Abrasion (Martindale) EN ISO 12947-2 Pressure applied: 12 kPa (cycles until breakdown) | >100,000 | | 77,000 | |
|  | Warp | Weft | Warp | Weft |
| Breaking strength (N) | 1020 | 710 | 980 | 780 |
| Elongation (%) | 22 | 18 | 30 | 18 |
| Limited flame spread EN ISO 15025:2003 (B) (before washing) | | | | |
| Flame | No | No | No | No |
| Hole | No | No | No | No |
| Debris | No | No | No | No |
| Afterflame(s) | 0 | 0 | 0 | 0 |
| Afterglow(s) | 0 | 0 | 0 | 0 |
| Limited flame spread EN ISO 15025:2003 (B) (after washing ISO 6330) | | | | |
| Flame | No | No | No | No |
| Hole | No | No | No | No |
| Debris | No | No | No | No |
| Afterflame(s) | 0 | 0 | 0 | 0 |
| Afterglow(s) | 0 | 0 | 0 | 0 |

What is claimed is:

1. A treated fabric that is protective against molten metal, the treated fabric comprising a base fabric comprising non-melting fibres, the base fabric being treated on one or both sides with a cross-linkable polymer cross-linked to form a matrix with the fibres of the base fabric, ceramic particles suspended in the matrix, a flame retardant, and optionally a silicone elastomer and/or glyoxal, wherein the ceramic particles are silicon carbide.

2. The treated fabric of claim 1, wherein the base fabric comprises aramid fibres.

3. The treated fabric of claim 1, wherein the base fabric comprises p-aramid fibres.

4. The treated fabric of claim 1, wherein the cross-linked polymer is a cross-linked polyurethane.

5. The treated fabric of claim 1, wherein the cross-linked polymer is a cross-linked polyurethane, comprising the monomers hexamethylenediisocyanate (HMDI) and a polyesterpolyol having a linear or branched polyester component, and having a weight average molecular weight of 1,000-10,000 g/mol.

6. The treated fabric of claim 1, wherein the cross-linked polymer is cross-linked with a cross-linking agent selected from polyisocyanates.

7. The treated fabric of claim 1, wherein the ceramic particles have a particle size distribution between at or about 0.1 to 10 microns.

8. A garment for protecting the wearer against molten metal, the garment comprising the treated fabric of claim 1.

9. A method for manufacturing a fabric protective against molten metals, the method comprising the steps:
 (1) providing a base fabric comprising non-melting fibres;
 (2) treating the base fabric with:
 a cross-linkable polymer;
 a cross-linking agent;
 ceramic particles which are silicon carbide;
 a flame retardant;
 and optionally a silicone elastomer; and/or glyoxal;
 (3) cross-linking the polymer to form a matrix with the fibres of the base fabric with the ceramic particles suspended therein.

10. The method of claim 9, wherein the base fabric comprises aramid fibres.

11. The method of claim 9, wherein the base fabric comprises p-aramid fibres.

12. The method of claim 9, wherein the cross-linked polymer is a cross-linked polyurethane.

13. The method of claim 9, wherein the cross-linked polymer is a cross-linked polyurethane, comprising the monomers hexamethylenediisocyanate (HMDI) and a polyesterpolyol having a linear or branched polyester component, and having a weight average molecular weight of 1,000-10,000 g/mol.

14. The method of claim 9, wherein the cross-linked polymer is cross-linked with a cross-linking agent selected from polyisocyanates.

15. The method of claim 9, wherein the ceramic particles have a particle size distribution between at or about 0.1 to 10 microns.

16. A method for protecting a person from molten metal, comprising the step of providing the person with a garment comprising a treated fabric, wherein the treated fabric comprises a base fabric comprising non-melting fibres, the base fabric being treated on one or both sides with a composition comprising a cross-linked polymer cross-linked to form a matrix with the fibres of the base fabric, ceramic particles which are silicon carbide suspended in the matrix and a flame retardant.

17. The method of claim 16, wherein the base fabric comprises aramid fibres.

18. The method of claim 16, wherein the base fabric comprises p-aramid fibres.

19. The method of claim 16, wherein the cross-linked polymer is a cross-linked polyurethane.

20. The method of claim 16, wherein the cross-linked polymer is a cross-linked polyurethane, comprising the monomers hexamethylenediisocyanate (HMDI) and a polyesterpolyol having a linear or branched polyester component, and having a weight average molecular weight of 1,000-10,000 g/mol.

21. The method of claim 16, wherein the cross-linked polymer is cross-linked with a cross-linking agent selected from polyisocyanates.

22. The method of claim 16, wherein the ceramic particles have a particle size distribution between at or about 0.1 to 10 microns.

* * * * *